David C. Landgraf
INVENTOR.

March 20, 1962 D. C. LANDGRAF 3,026,001
GRASS ROOT PLANTER
Filed Nov. 19, 1958 2 Sheets-Sheet 2
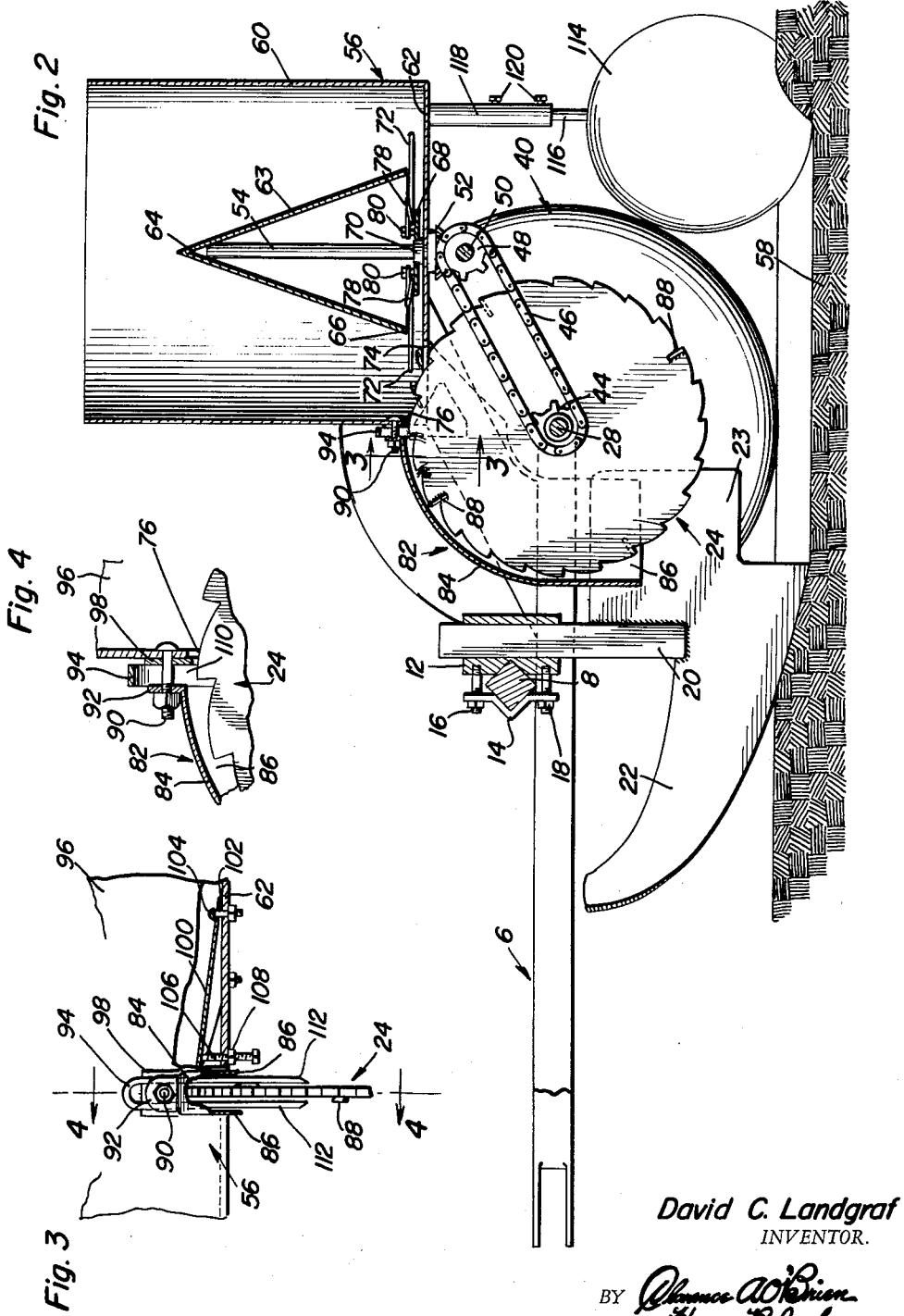
David C. Landgraf
INVENTOR.

United States Patent Office 3,026,001
Patented Mar. 20, 1962

3,026,001
GRASS ROOT PLANTER
David C. Landgraf, Star Rte., Simpson, Okla.
Filed Nov. 19, 1958, Ser. No. 774,950
4 Claims. (Cl. 221—42)

This invention relates to certain new and useful improvements in a relatively simple planting vehicle which is expressly constructed and designed to transport and plant Bermuda grass or the like and has reference in particular to a wheel supported frame carrying a specially constructed hopper.

As such, the invention embodies certain structural and functional improvements in a grass root planter of the type disclosed in my co-pending patent application Serial No. 594,524, filed June 28, 1956, now Patent No. 2,889,-959 dated June 9, 1959, of which this application is a continuation-in-part.

The instant invention has many of the characteristics and features of the planter disclosed in my earlier application but is more particularly characterized by a number of improvements. First the rotor is of a different construction. That is to say there is a vertical shaft at the center of the hopper and this has a collar at the lower portion thereof just above the plane of the bottom of the hopper which collar is provided with novelly constructed and arranged resilient raking and distributing fingers which function in the hopper. There is a deflector and distributing cone on the shaft with the base thereof cooperating with the median portions of the respective radial fingers.

Novelty is also predicated upon the provision of a hood-like shield of segmental form and defining a channel through which the teeth of the saw sweep before the grass roots are permitted to gravitate therefrom into the furrow in the ground.

The saw is novel too in that diametrically opposite outstanding lugs are provided on the marginal portions thereof to drag and scrape the walls of the shield in a manner to prevent undue accumulation of grass roots in the channel of the shield.

Novelty is also predicated on the mounting of the intake end of the shield adjacent the slot in the vertical or side wall of the hopper and wherein said means is characterized by an inverted U-shaped member and also a plate which cooperates with the slot in reducing to a minimum the likelihood of the slot becoming clogged up with the grass roots or extraneous material that might have accumulated therein.

Then, too, novelty is predicated on the provision on the interior of the bottom of the hopper of a slanting shield or ramp which facilitates riding of the springy fingers thereover and prevents the fingers from accidentally engaging in the saw teeth in a manner to interfere with the intended pickup and gravitating function of the teeth of the saw.

Other objects, features and advantages will become more readily apparent from the following description and the accompanying drawings.

In the drawings, wherein like numerals are employed to designate like parts throughout the views:

FIG. 2 is a view taken centrally on the plane of the longitudinal line 2—2 of FIG. 1, looking in the direction of the arrows and with parts in section and elevation;

FIG. 3 is an enlarged fragmentary view on the vertical line 3—3 of FIG. 2; and

FIG. 4 is a detail sectional view of certain of the parts showing the same sufficiently enlarged to bring out the particular construction and arrangement thereof.

Figure 1:
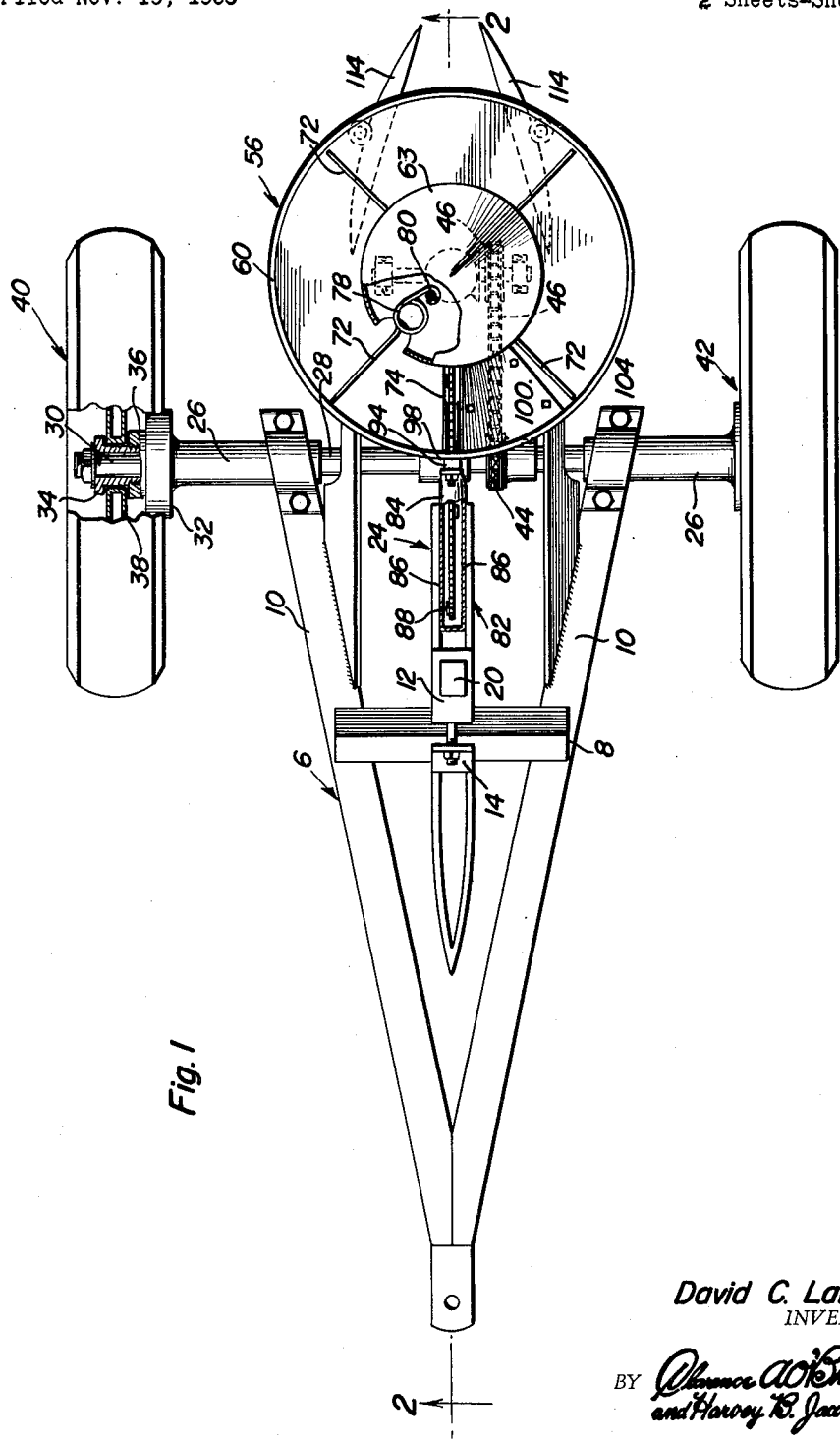
FIG. 1 is a plan view with a portion of the hub of the wheel broken away to show the hub construction and with said view providing an over-all view of the machine as constructed in accordance with the principles of the instant invention.

Referring now to the drawings and with particular reference to FIGS. 1 and 2 the numeral 6 may be said to designate, generally speaking, an A-frame. The cross member 8 between the diverging arm portions 10 is provided with a socket member 12 held in place by a V-clamp 14 and a suitable arrangement of studs 16 and assembling and retaining nuts 18. With this arrangement the upright or post 20 carried by the median portion of the plow 22 is properly and adjustably mounted. The rear spaced parallel portions 23 of the plow provide wings between which a sector or segmental portion of the toothed saw or wheel 24 operates. Before going further with the saw I prefer to return to a consideration of the frame of the machine which as shown in FIG. 1 has suitable coaxial bearings 26 for adjacent end portions of the wheel supported shaft 28. The end portions 30 project beyond the flanged heads 32 where they constitute journals to accommodate the screw threaded sleeve 34 and nut 36 which defines an appropriate hub. The hub portion 38 of the wheel 40 turns freely on this hub. The other similarly positioned wheel 42 is fixed to the shaft and constitutes a ground or traction wheel which imparts motion to the sprocket 44 (FIG. 2) which drives sprocket chain 46 and a complemental sprocket wheel 48 on a suitable shaft 50 operating the intermeshing gears 52 and imparting motion to an upstanding or driven shaft 54.

It is significant now to introduce the open top generally cylindrical hopper 56 which in practice is loaded or charged with the desired variety of grass roots (Bermuda grass) to be delivered into the furrow 58. The hopper has a cylindrical body portion 60 and a flat bottom 62. A central hole in the bottom permits the aforementioned driven shaft to enter the central space or portion of the hopper. This shaft carries a conical deflector 63 welded in place at its apical end portion as at 64. The base 66 of the cone or deflector is spaced above the bottom 62 a distance sufficient to accommodate an annulus 68 mounted by way of a collar 70 on the lower end of the shaft and which annulus serves to support the cooperating horizontal radial circumferentially spaced raking and distributing fingers 72. The fingers, shaft, cone deflector and other parts constitute a driven rotor which turns around in the space of the hopper and distributes the grass roots for passage through the radial slot 74 in the outer marginal edge portion of the bottom 62. This slot is in communication and therefore alined with the vertical slot 76 (FIG. 4) in the bottom of the side wall of the hopper. These slots serve to permit the rotation of the teeth of the segmental portion of the saw therethrough in a manner that the teeth pick up the grass roots and carry them away from the hopper to be permitted to gravitate into the furrow 58. Returning to the fingers it will be seen that the intermediate portion of each finger is formed with a springy coil 78 and the extreme inner end is bolted at 80 on the hub-like annulus. One might consider the collar 70 and annulus 68 a hub carried by the shaft and which hub in turn carries the resilient or springy fingers. The outer free ends of the fingers project beyond the base of the cone and into the space of the hopper where they rake around and gather up the grass roots to be dispensed.

Attention is directed to FIGS. 3 and 4 in conjunction with FIG. 2. To begin with the numeral 82 in FIG. 2 designates an inverted arcuate channel-like guard or shield. This has a web or curved bight portion 84 connecting the spaced parallel side walls 86. This shield provides a channel which is in line with the aforementioned slots 74 and 76. It follows that rotation of the saw causes the grass roots to be channeled from the hopper into a position so that they gravitate from the saw teeth as the teeth rotate over the furrow 58. On diametrically opposite sides the marginal portion of the saw is provided with outstanding scraping and cleaning lugs 88 which wipe against the side walls 86 to keep the same clean and to prevent clogging in the channel through which the saw may then sweep freely.

With reference again to FIGS. 3 and 4 the numeral 90 designates a bolt which is fastened to the hopper and which serves to attach the retaining flange 92 of the shield to the hopper by way of an intervening inverted U-shaped or horseshoe-like spacer member 94. Interposed between the member 94 and the exterior surface of the wall 96 is a cleat or plate-like clip 98 an edge portion of which depends below the top of the slot 76 so as to assist in keeping the saw teeth clean and also in insuring that the saw teeth effectively pick up the grass roots to be planted.

There is yet to be mentioned that it is desirable to keep the free end portions 72 of the fingers clear of actual collision with the saw teeth. This is accomplished by using a ramp 100, this being a generally arcuate plate which is loosely bolted along the edge portion 102 by bolts or equivalent fasteners 104. The free edge of the plate is propped up to the desired elevation by the cooperating bolt 106 and associated locknut 108. The springy fingers ride over this ramp and clear the saw teeth. Consequently disruptive colliding between the fingers of the rotor and teeth of the saw is reduced to a practical minimum. If desired the lower ends of the arms or limbs 110 of the inverted U-shaped spacer 94 may be provided with triangulate guards 112 which are disposed directly beneath the horizontal slot 74 and are in close proximity to the opposite sides of the saw blade to prevent the jamming of grass roots down through the slot 74 and consequently rendering the operation more efficient and preventing needless loss and displacement of grass roots.

It is within the purview of the invention to provide a pair of appropriately angled and suspended discs 114 which cooperate in covering the trough or furrow 58 after the sprigs have been planted therein. Each disc has a supporting or suspending rod 116 fitting into a socket 118 and held in place by setscrews 120.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A carrier and planter for Bermuda grass roots and the like comprising, in combination, a mobile wheel supported frame, a supply hopper containing grass roots fixedly mounted in an elevated position on said frame, said hopper having a circular retaining wall and a substantially flat bottom which is circular in plan, said bottom being provided with a single radial slot having an open outer end, the lower portion of the circular retaining wall of said hopper adjacent to the slot in said bottom being provided with a vertical slot registering with said radial slot, said slots being restricted in width and being adapted to permit movement therethrough of a saw, a circular saw mounted for rotation on said frame and disposed in a vertical plane, operating means carried by said frame and operatively connected to said saw, a segmental portion of the toothed edge of said saw being moved by the operating means through said slots in such a manner that grass roots contained in the hopper and bridging the radial slot are accordingly carried by the saw teeth and are progressively withdrawn by way of the slots and teeth, a vertical shaft means mounted for rotation centrally in said hopper, a deflector cone carried by said shaft means and arranged centrally in said hopper, a hub structure on said shaft means, a plurality of resilient fingers mounted on said hub structure and extending radially outwardly therefrom in a plane between the hopper bottom and said cone and extending into the path of said saw, and an inclined ramp means provided on said bottom at one side of said radial slot whereby the outer ends of said fingers are engageable with and deflectable by said ramp means above said segmental portion of said saw.

2. A carrier and planter for Bermuda grass roots and the like comprising, in combination, a mobile wheel-supported frame, a supply hopper containing grass roots fixedly mounted in an elevated position on said frame, said hopper having a circular retaining wall and a substantially flat bottom which is circular in plan, said bottom being provided with a single radial slot having an open outer end, the lower portion of the circular retaining wall of said hopper adjacent to the slot in said bottom being provided with a vertical slot registering with said radial slot, said slots being restricted in width and being adapted to permit movement therethrough of a saw, a circular saw mounted for rotation on said frame and disposed in a vertical plane, operating means carried by said frame and operatively connected to said saw, a segmental portion of the toothed edge of said saw being moved by the operating means through said slots in such a manner that grass roots contained in the hopper and bridging the radial slot are accordingly carried by the saw teeth and are progressively withdrawn by way of the slots and teeth, vertical shaft means mounted for rotation centrally in said hopper, a rotor carried by said shaft means and including a conical deflector secured to the shaft means, a hub secured to the shaft means below said conical deflector, and a plurality of circumferentially spaced horizontal fingers radiating from said hub, each finger having a median portion thereof coiled and providing a yieldable portion, the outer ends of said fingers cooperating with the teeth of the saw and the cooperating slots, said depending conical deflector having its apical portion attached to the upper end of said shaft and its body and base portions concentrically surrounding the shaft, said conical deflector having a base disposed in a plane above the plane of said fingers and said fingers operating between the bottom of the hopper and the base of the deflector, the base of said deflector being predetermined so that the outer ends of the fingers extend well beyond the base, said limited segmental portion of said saw intersecting the plane of operation of said fingers, and means provided on the bottom of the hopper and engageable by said fingers for deflecting the same above said segmental portion of the saw.

3. The structure as defined in claim 1 together with an arcuate channel-shaped shield attached to the outside of said hopper in alignment with the slot in said side wall and having a segmental portion of said saw operating therethrough, and outstanding lugs provided marginally on said saw, said lugs constituting scraping and cleaning elements which have a wiping contact with the interior of said shield.

4. The device as defined in claim 1 together with adjustable means provided on the bottom of said hopper in engagement with said ramp means for raising and lowering said ramp means.

References Cited in the file of this patent

UNITED STATES PATENTS

| 608,748 | Bedoret | Aug. 9, 1898 |
| 1,512,256 | White | Oct. 21, 1924 |
| 1,746,590 | Hazle | Feb. 11, 1930 |
| 2,685,390 | Milton | Aug. 3, 1954 |
| 2,800,065 | Kropp | July 23, 1957 |
| 2,889,959 | Landgraf | June 9, 1959 |

FOREIGN PATENTS

| 24,724 | Denmark | July 25, 1919 |
| 289,928 | Switzerland | July 16, 1953 |